US010944154B1

(12) United States Patent
Tong et al.

(10) Patent No.: US 10,944,154 B1
(45) Date of Patent: Mar. 9, 2021

(54) WIRELESS AUDIO SYSTEM AND METHOD FOR WIRELESSLY COMMUNICATING AUDIO INFORMATION USING THE SAME

(71) Applicant: BESTECHNIC (SHANGHAI) CO., LTD., Shanghai (CN)

(72) Inventors: Weifeng Tong, Shanghai (CN); Liang Zhang, Shanghai (CN); Bin Luo, Shanghai (CN); Fei Luo, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/093,636

(22) Filed: Nov. 10, 2020

(30) Foreign Application Priority Data

Sep. 24, 2020 (CN) .......................... 202011013448.9
Sep. 24, 2020 (CN) .......................... 202011014162.2

(51) Int. Cl.
| | |
|---|---|
| *H01Q 1/24* | (2006.01) |
| *H01Q 1/22* | (2006.01) |
| *G06F 3/16* | (2006.01) |
| *H04W 4/80* | (2018.01) |
| *H04L 5/00* | (2006.01) |

(52) U.S. Cl.
CPC ............ *H01Q 1/243* (2013.01); *G06F 3/162* (2013.01); *H01Q 1/2208* (2013.01); *H04L 5/0055* (2013.01); *H04W 4/80* (2018.02)

(58) Field of Classification Search
CPC ....... H01Q 1/243; H01Q 1/2208; H04W 4/80; G06F 3/162; H04L 5/0055
See application file for complete search history.

(56) References Cited

U.S. PATENT DOCUMENTS

| | | | | |
|---|---|---|---|---|
| 10,200,791 | B1* | 2/2019 | Liu | H04W 4/80 |
| 10,237,657 | B2* | 3/2019 | McAuliffe | H03H 7/38 |
| 2008/0226094 | A1* | 9/2008 | Rutschman | H04R 5/033 381/79 |
| 2009/0197532 | A1* | 8/2009 | Wyper | H04M 1/6066 455/41.2 |
| 2012/0231732 | A1* | 9/2012 | Kerselaers | H04B 5/0006 455/41.1 |
| 2014/0132478 | A1* | 5/2014 | Wang | H01Q 21/24 343/893 |

(Continued)

*Primary Examiner* — David Bilodeau
(74) *Attorney, Agent, or Firm* — Bayes PLLC

(57) ABSTRACT

Embodiments of wireless audio systems and methods for wirelessly communicating audio information are disclosed herein. In one example, wireless transceiver includes a first antenna, a second antenna, and a radio frequency (RF) module. The first antenna is configured to establish a first wireless communication link with an audio source. The second antenna is configured to establish a second wireless communication link with another wireless transceiver. The RF module is configured to receive audio information from the audio source using the first wireless communication link and transmit audio play information to the another wireless transceiver using the second wireless communication link. A first RF radiation field of the first antenna has a higher intensity in a first direction than a second direction orthogonal to the first direction, and a second RF radiation field of the second antenna has a higher intensity in the second direction than the first direction.

18 Claims, 11 Drawing Sheets

(56) References Cited

U.S. PATENT DOCUMENTS

| | | | | |
|---|---|---|---|---|
| 2014/0295768 | A1* | 10/2014 | Wu | H04B 15/00 |
| | | | | 455/63.4 |
| 2015/0141089 | A1* | 5/2015 | McCaughey | H04B 1/3838 |
| | | | | 455/575.5 |
| 2016/0219358 | A1* | 7/2016 | Shaffer | H04R 1/1041 |
| 2018/0084456 | A1* | 3/2018 | Gostev | H04W 84/18 |
| 2018/0242212 | A1* | 8/2018 | Belverato | H04W 72/02 |
| 2020/0328824 | A1* | 10/2020 | Rauhala | H04B 5/0006 |

* cited by examiner

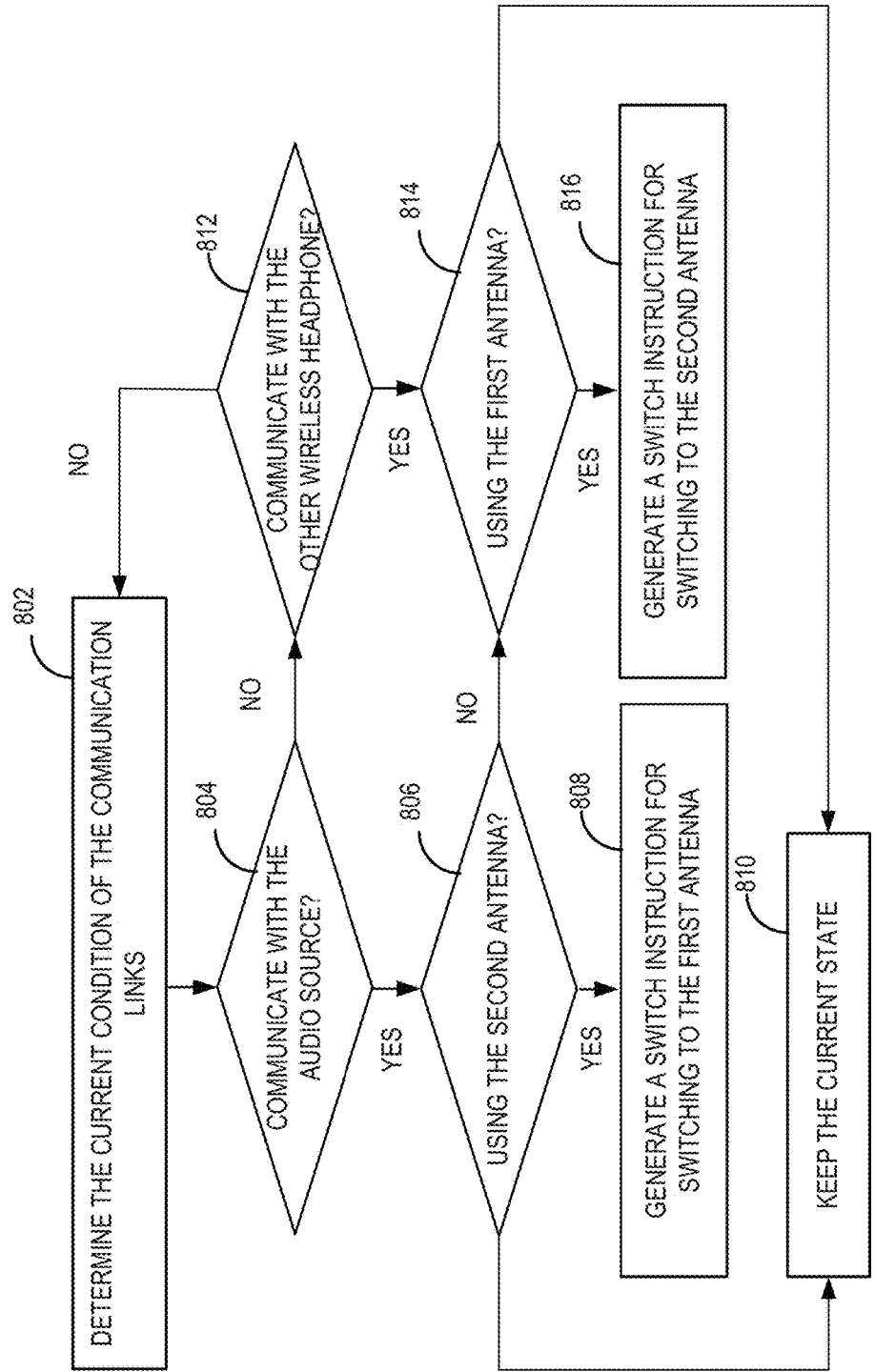

WIRELESS AUDIO SYSTEM AND METHOD FOR WIRELESSLY COMMUNICATING AUDIO INFORMATION USING THE SAME

CROSS-REFERENCE TO RELATED APPLICATION

This application claims the benefit of priority to Chinese Patent Application No. 202011013448.9, filed on Sep. 24, 2020 and Chinese Patent Application No. 202011014162.2, filed on Sep. 24, 2020 which are incorporated herein by reference in their entirety.

BACKGROUND

Embodiments of the present disclosure relate to wireless audio systems.

Loudspeakers, including headphones, have been widely used in daily life. Headphones are a pair of small loudspeaker drivers worn on or around the head over a user's ears, which convert an electrical signal to a corresponding sound.

Wired headphones, however, constrain the users' movement because of the wires (cords), and are particularly inconvenient during exercise. Conventional wireless headphones no longer need the wires between the headphones and the audio sources, but still require the wires between the left and right headphones.

SUMMARY

Embodiments of wireless audio systems and methods for wirelessly communicating audio information are disclosed herein.

In one example, wireless transceiver includes a first antenna, a second antenna, and a radio frequency (RF) module. The first antenna is configured to establish a first wireless communication link with an audio source. The second antenna is configured to establish a second wireless communication link with another wireless transceiver. The RF module is configured to receive audio information from the audio source using the first wireless communication link and transmit audio play information using the second wireless communication link. A first RF radiation field of the first antenna has a higher intensity in a first direction than a second direction orthogonal to the first direction, and a second RF radiation field of the second antenna has a higher intensity in the second direction than the first direction.

In another example, a wireless audio system includes a first wireless headphone and a second wireless headphone. The first wireless headphone is configured to receive, from an audio source, audio information based on a first wireless communication link using a first antenna and transmit, to a second wireless headphone, audio play information based on a second communication link using a second antenna. A first RF radiation field of the first antenna has a higher intensity in a first direction than a second direction orthogonal to the first direction, and a second RF radiation field of the second antenna has a higher intensity in the second direction than the first direction.

In still another example, a method for wirelessly communicating audio information is disclosed. The method includes receiving, from an audio source, audio information using a first wireless communication link established based on a first antenna and transmitting, to a wireless transceiver, audio play information using a second wireless communication link established based on a second antenna. The method further includes generating, a switch instruction for switching among the first antenna and the second antenna based on a currently using antenna and a wireless communication link to be established and switching, among the first antenna and the second antenna upon obtaining the switch instruction. A first RF radiation field of the first antenna has a higher intensity in a first direction than a second direction orthogonal to the first direction, and a second RF radiation field of the second antenna has a higher intensity in the second direction than the first direction.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 8 is a flow chart illustrating an exemplary method for antenna switching in accordance with an embodiment.

Figure 1A:
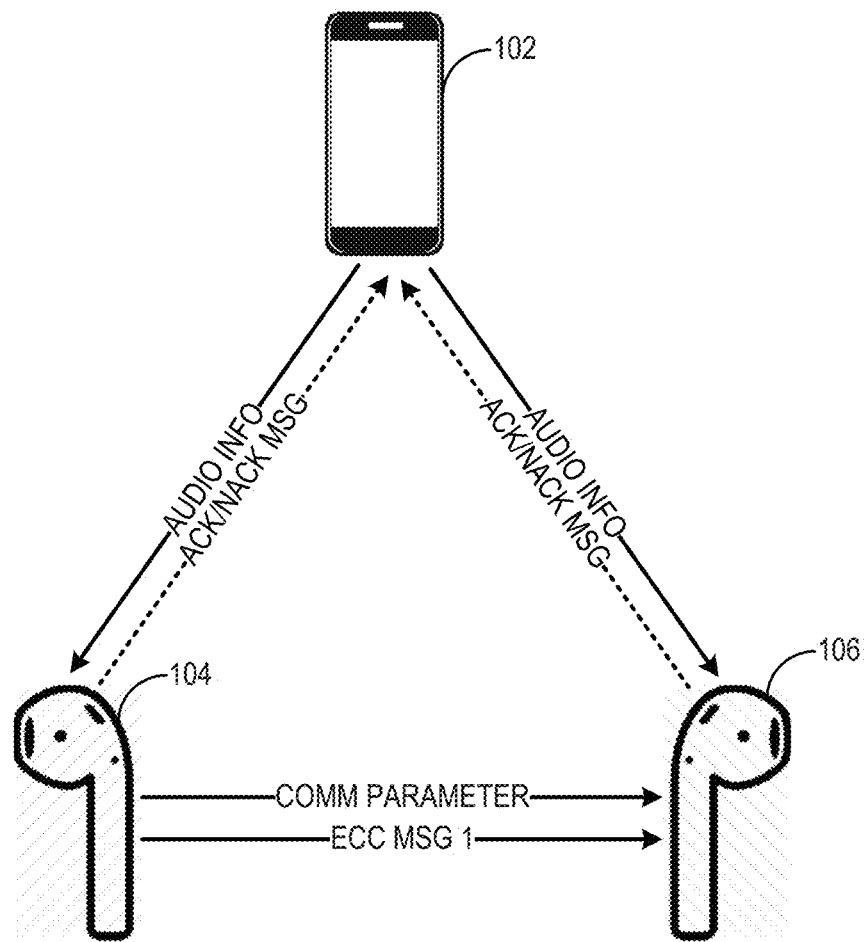
FIGS. 1A and 1B are block diagrams illustrating an exemplary wireless audio system in accordance with various embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

True wireless stereo (TWS) headphones (also known as untethered headphones) is a type of wireless headphones that remove the wires between the left and right headphones. In some TWS headphones, a primary wireless headphone can simultaneously communicate with an audio source and a secondary wireless headphone. For example, the audio source transmits data (music, audio, or data packets) to the primary wireless headphone using BLUETOOTH, and the primary wireless headphone then forwards the data to the secondary wireless headphone. Existing wireless headphones only use one antenna for communicating with both the other wireless headphone and the audio source. The solutions fail to take into account the Radio Frequency (RF) radiation field of the antenna (e.g., normally, the intensity of the RF radiation field of the antenna is asymmetric in horizontal and vertical directions, i.e., having a dominant radiation direction). When data is transmitted at the non-dominant radiation direction of the antenna, it would cause the high power consumption of the wireless headphones and may affect the data transmission quality between the wireless headphones and the audio source, such as causing lagging and/or high latency.

As will be disclosed in detail below, among other novel features, the wireless audio systems disclosed herein can achieve "true wireless stereo" with improved data transmission quality and robustness against interference and reduced headphone power consumption. The wireless audio systems disclosed herein take into consideration the relative position of the headphones and the audio source, e.g., the wireless headphones are normally placed horizontally (e.g., worn on both side of the user's head), above the audio source (e.g., placed in a pocket, or hold in user's hands), and the intensity differences of the RF radiation field in different directions (e.g., the difference in horizontal and vertical directions) for each antenna.

In some embodiments of the present disclosure, each wireless headphone (e.g., the primary wireless headphone and the secondary wireless headphone) includes two antennas, one having an RF radiation field with a higher intensity in a vertical direction than a horizontal direction (i.e., having a dominant radiation direction in the vertical direction), and the other having an RF radiation field with a higher intensity in the horizontal direction than the vertical direction (i.e., having a dominant radiation direction in the horizontal direction). The primary wireless headphone may establish a normal communication link with the audio source to receive the audio data (e.g., stereo audio) mainly using the first antenna (e.g., having the dominant radiation direction in the vertical direction) and may establish a communication link with the secondary wireless headphone mainly using the second antenna (e.g., having the dominant radiation direction in the vertical direction) to transmit data, such as audio play information (e.g., synchronizing information, frequency hopping information, volume control information, role switching information, audio information, or communication parameters associated with the first wireless communication link) and/or error-correcting code. In some embodiments, depends on the current communication link in use (e.g., the current antenna in use) and the wireless communication link to be established, the use of the first antenna and the second antenna may switch (described in details below).

In some embodiments, the secondary wireless headphone may then establish a snoop communication link with the audio source to snoop communications on the normal communication link based on the communication parameters and receive the audio data from the audio source as well. Using the antenna having the dominant radiation direction in the vertical direction when being worn for transmitting data in a substantially vertical direction (e.g., with the audio source being placed blow the wireless headphones) while using the antenna having the dominant radiation direction in the horizontal direction when being worn for transmitting data in a substantially horizontal direction (e.g., between the wireless headphones while both of them are being worn on both sides of the user's head), the power consumption of the wireless headphones (e.g., used for data transmission) can be reduced, and the data transmission quality and robustness against interference between the wireless headphones and the audio source can be improved. Additionally, having the secondary wireless headphone work in the snoop mode can further reduce the power consumption of the primary wireless headphone because the primary wireless headphone no longer needs to forward the audio data to the secondary wireless headphone.

Moreover, the first antenna (e.g., the normal communication link established accordingly) can also be used for transmitting acknowledgment (ACK) messages to the audio source in response to successfully receiving the audio information from the audio source or transmit negative acknowledgment (NACK) messages to the audio source in response to not successfully receiving the audio information from the audio source. The second antenna (e.g., the communication link established between the wireless headphones) can be used for transmitting error-correcting message(s) including an error-correcting code (ECC) based on the successfully-received audio data to the other wireless headphone. The ECC can be used to correct the error in the audio data received by the other wireless headphone without re-transmitting the audio data. As the audio information may not necessarily need to be re-transmitted in error correcting message for correcting error in the audio data received by the other wireless headphone (e.g., the error has been corrected using the first error-correcting message), the amount of data of transmitted for error-correcting can be reduced, and thus the system reliability and efficiency may be improved.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1A is a block diagram illustrating an exemplary wireless audio system 100 in accordance with an embodiment. Wireless audio system 100 may include an audio source 102, a primary wireless headphone 104 (e.g., the first wireless headphone), and a secondary wireless headphone 106 (e.g., the second wireless headphone). Audio source 102 may be any suitable device that can provide audio information including, for example, music or voice in the digital or analog format. Audio source 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. Primary wireless headphone 104 and secondary wireless headphone 106 may be a pair of loudspeakers that can be worn on or around the head over a user's ears. Primary wireless headphone 104 and secondary wireless headphone 106 may be any electroacoustic transducers that convert an electrical signal (e.g., representing the audio information provided by audio source 102) to a corresponding sound. In some embodiments, each primary wireless headphone 104 and secondary wireless headphone 106 may be an earbud (also known as earpiece) that can plug into the user's ear canal. In some embodiments, primary wireless headphone 104 and secondary wireless headphone 106 may be TWS headphones, which are individual units that are not physically held by a band over the head and/or electrically connected by a cord. Primary wireless headphone 104 and/or secondary wireless headphone 106 may be combined with a microphone to form a headset according to some embodiments. It is understood that although in FIG. 1A, wireless audio system 100 includes both audio source 102 and the pair of primary and secondary wireless headphones 104 and 106, in some embodiments, wireless audio system 100 may include only primary wireless headphone 104 and secondary wireless headphone 106.

As shown in FIG. 1A, bidirectional communications may be established between audio source 102 and primary wireless headphone 104 using a first antenna (not shown) having the dominate radiation direction in the substantially vertical direction when being worn, and between primary wireless headphone 104 and secondary wireless headphone 106 using a second antenna (not shown) having the dominate radiation direction in the substantially horizontal direction when being worn. The first and the second antennas will be described in detail below. In some embodiments, a normal communication link may be established between audio source 102 and primary wireless headphone 104 using a short-range wireless communication (e.g., the BLUETOOTH communication or WiFi communication). That is, primary wireless headphone 104 may work in the normal mode. In the normal mode, primary wireless headphone 104 may receive audio information (e.g., in data packets) transmitted by a carrier wave from audio source 102 via the normal communication link established based on the first antenna.

In some embodiments, audio information may be a stream of audio stereo information in the form of compressed or uncompressed stereo samples for first and second audio channels, such as left-channel audio information and right-channel audio information or the like. The normal communication link may be bidirectional such that primary wireless headphone 104 may transmit messages back to audio source 102 in response to the reception of the audio information from audio source 102. As described below in detail, in some embodiments, primary wireless headphone 104 may transmit ACK messages to audio source 102 in response to successfully receiving the audio information from audio source 102 or transmit NACK messages to audio source 102 in response to not successfully receiving the audio information from audio source 102. In some embodiments, the ACK/NACK messages indicate whether both primary and secondary wireless headphones 104 and 106 receive the audio information successfully. For example, as described in details below, primary and secondary wireless headphones 104 and 106 may inform each other the successful receive of the audio information through the ECC message. In some embodiments, the short-range wireless communication between audio source 102 and primary wireless headphone 104 is a unidirectional communication link in which primary wireless headphone 104 receives the audio information from audio source 102, but does not transmit data (e.g., ACK or NACK messages) back to audio source 102.

In some embodiments, a snoop communication link may be established between audio source 102 and secondary wireless headphone 106 using the same short-range wireless communication between audio source 102 and primary wireless headphone 104 (e.g., the BLUETOOTH or WiFi). That is, secondary wireless headphone 106 may work in the snoop mode in which the connection with secondary wireless headphone 106 may not be known by audio source 102. In the snoop mode, secondary wireless headphone 106 may snoop (also known as "listen" or "eavesdrop") the communications between audio source 102 and primary wireless headphone 104 on the normal communication link. By snooping the communications between audio source 102 and primary wireless headphone 104, secondary wireless headphone 106 may also receive the audio information (e.g., in data packets) transmitted by the carrier wave from audio source 102 via the snoop communication link. The snoop communication link may be bidirectional such that secondary wireless headphone 106 may transmit messages back to audio source 102 in response to the reception of the audio information from audio source 102. As described below in detail, the messages transmitted by secondary wireless headphone 106 may include, for example, ACK messages and NACK messages.

In some embodiments, audio information may be transmitted by audio source 102 according to the BLUETOOTH protocol at the working radio frequency (RF) band between 2,402 MHz and 2,480 MHz or between 2,400 MHz and 2,483.5 MHz (referred to herein as "2.4 GHz"). BLUETOOTH is a wireless technology standard for exchanging data over short distances, and the BLUETOOTH protocol is one example of short-range wireless communication protocols. In one example, audio source 102 may apply the advanced audio distribution profile (A2DP) of the BLUETOOTH protocol for transmitting the audio information. For example, based on the A2DP, a BLUETOOTH audio streaming of music or voice may be streamed from audio source 102 to primary and secondary wireless headphones 104 and 106 over BLUETOOTH connections. In some embodiments, audio information may be transmitted by audio source 102 according to the WiFi protocol at the working RF band of 2.4 GHz or 5 GHz. WiFi is a wireless technology for wireless local area networking based on the IEEE 802.11 standards, and the WiFi protocol (also known as the 802.11 protocol) is another example of short-range wireless communication protocols. It is understood that the transmission of the audio information by audio source 102 may be using any other suitable short-range wireless communication besides BLUETOOTH and WiFi.

As shown in FIG. 1A, to enable secondary wireless headphone 106 work in the snoop mode, primary wireless headphone 104 may transmit, to secondary wireless headphone 106, communication parameters associated with the normal communication link between audio source 102 and primary wireless headphone 104 using a communication link established based on the second antenna. The communication parameters may include, but are not limited to, the address of audio source 102 (e.g., the IP address or media access control (MAC) address) and the encryption parameters between audio source 102 and primary wireless headphone 104. The transmission of the communication parameters may be carried on by a short-range wireless communication that is the same type as that for transmitting the audio information by audio source 102. For example, the short-range wireless communication may also be BLUETOOTH communication or WiFi communication. In some embodiments, audio play information such as synchronizing information, frequency hopping information, volume control information, role switching information, and audio information can also be transmitted along with the communication parameters between primary wireless headphone 104 and secondary wireless headphone 106 using the communication link established based on the second antenna.

Upon receiving the communication parameters from primary wireless headphone 104, secondary wireless headphone 106 can establish the snoop communication link with audio source 102 based on the communication parameters. For example, secondary wireless headphone 106 may pretend to be primary wireless headphone 104 so that audio source 102 does not recognize secondary wireless headphone 106 as a newly-connected device and thus, will not disconnect and reconnect with secondary wireless headphone 106.

In some embodiments, primary wireless headphone 104 may be configured to generate an error-correcting code (ECC) based on the audio information (e.g., by coding the payload of the BLUETOOTH audio data packet). Primary wireless headphone 104 then may transmit an error-correcting message (ECC MSG) including the ECC to secondary wireless headphone 106. The ECC may include, but not limited to, Reed-Solomon (RS) code, Bose-Chaudhuri-Hocquenghem (BCH) code, etc. In case secondary wireless headphone 106 does not successfully receive the audio information from audio source 102 (e.g., error found in the payload of a BLUETOOTH audio data packet), the ECC contained in the error-correcting message from primary wireless headphone 104 may be used by secondary wireless headphone 106 to correct the audio information (e.g., the error found in the payload of the BLUETOOTH audio data packet). In some embodiments, the error-correcting message does not include an ECC and the transmission of the error-correcting message without the ECC can only serve as an ACK message indicative of the successful reception of the audio information by primary wireless headphone 104.

Figure 1B:
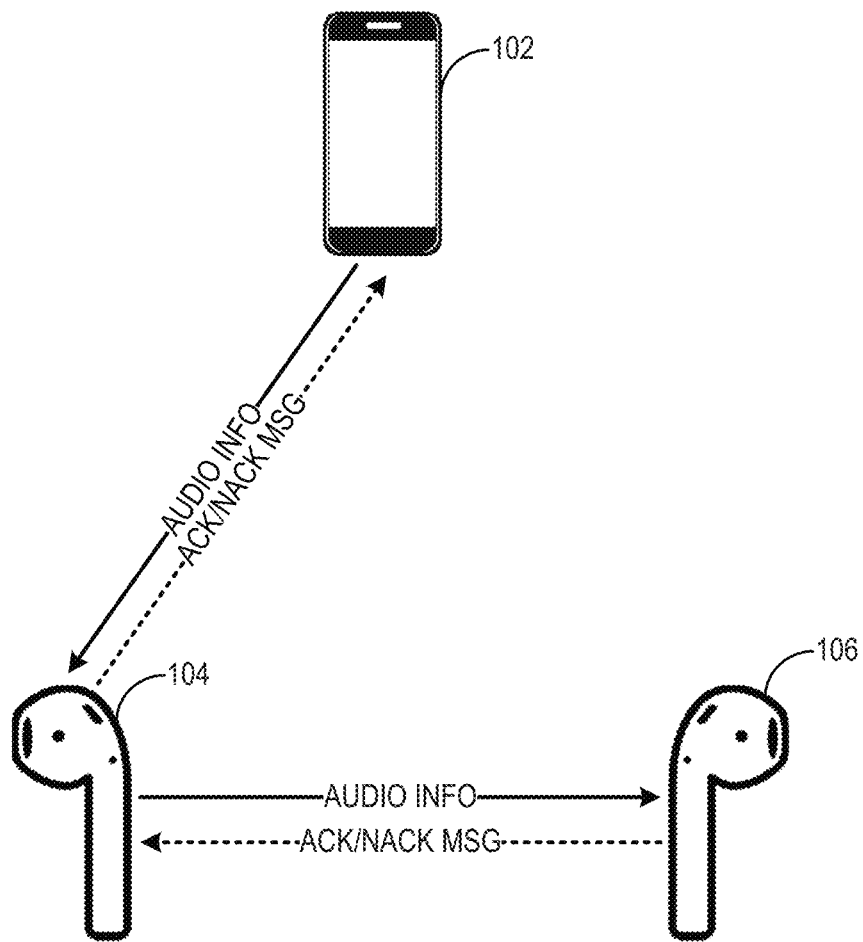

In some embodiments, as illustrated in FIG. 1B, instead of transmitting communication parameters of the normal communication link and/or the ECC MSG, primary wireless headphone 104 may redirect the audio information to secondary wireless headphone 106 using the communication link established based on the second antenna. When secondary wireless headphone 106 successfully receives the audio information from primary wireless headphone 104, it may transmit an ACK or a NACK to primary wireless headphone 104 indicating whether the audio information is received correctly.

It is understood that in implementing the wireless communication features (e.g., establishing the communication link with the audio source and/or the other wireless headphone) disclosed herein, the roles of primary and secondary wireless headphones can be switched. In other words, either primary or secondary wireless headphone 104 or 106 can be the party generating and transmitting the communication parameters, the ECC, and/or the audio information (transmitting headphone), and either primary or secondary wireless headphone 104 or 106 can be the party utilizing the communication parameters, the ECC, and/or the audio information transmitted from the transmitting headphone for receiving the audio information (receiving headphone).

Figure 2:
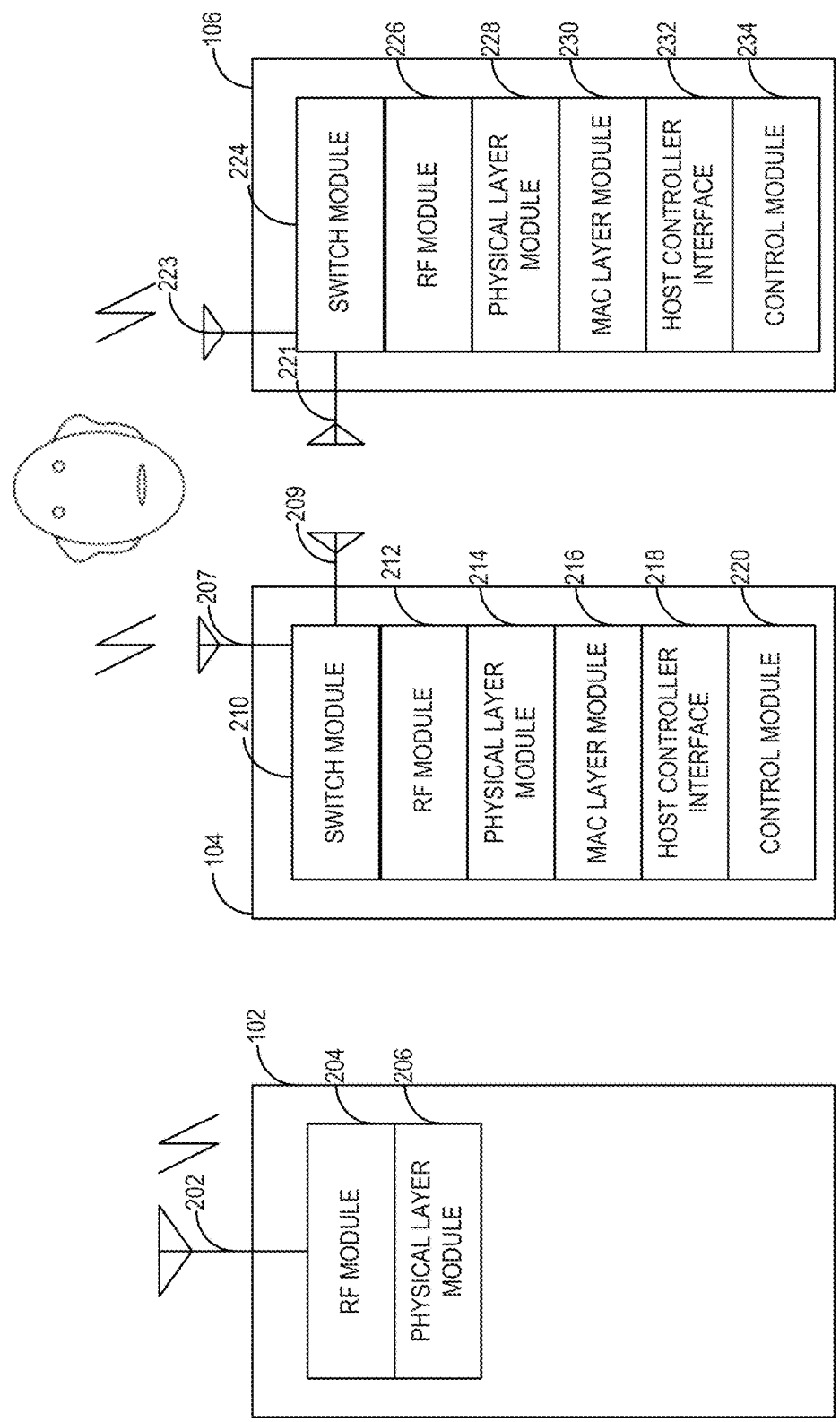
FIG. 2 is a detailed block diagram of the exemplary wireless audio system in FIGS. 1A and 1B in accordance with an embodiment.

FIG. 2 is a detailed block diagram of exemplary wireless audio system 100 in FIGS. 1A-1B in accordance with an embodiment. Audio source 102 in this example includes an antenna 202, a radio-frequency (RF) module 204, and a physical layer module 206. It is understood that additional module(s) may be included in audio source 102, either in the same integrated circuit (IC) chip in which RF module 204 and physical layer module 206 are formed or in a separate IC chip.

Antenna 202 may include an array of conductors for transmitting and receiving radio waves at one or more RF bands corresponding to RF module 204. For example, antenna 202 may transmit audio information modulated by a carrier wave using RF module 204. As described above, the audio information may be any music and/or voice information provided by audio source 102. For example, the audio information may be a stream of audio stereo information in the form of compressed or uncompressed stereo samples for first and second audio channels, such as left-channel audio information and right-channel audio information or the like. In some embodiments, the audio information may be mono audio information in a single audio channel or audio information in more than two separate audio channels (e.g., left, central, and right channels). Antenna 202 may also receive the messages modulated by a carrier wave. For example, the messages may be any messages used for acknowledging the reception of the audio information by primary wireless headphone 104 or secondary wireless headphone 106, such as ACK and NACK messages.

RF module 204 and physical layer module 206 may be in the same IC chip that implements a short-range wireless communication protocol, such as the BLUETOOTH protocol or WiFi protocol. RF module 204 may be configured to modulate the audio information using the carrier wave at a frequency, for example, at 2.4 GHz for BLUETOOTH or WiFi communication, and transmit the audio information at the frequency via antenna 202. RF module 204 may be further configured to receive and demodulate the messages and/or the audio information (e.g., the voice information during voice calls) from the carrier wave at the same frequency, for example, at 2.4 GHz. Physical layer module 206 may be configured to generate the physical link (baseband) between audio source 102 and primary wireless headphone 104 (and secondary wireless headphone 106 even though audio source 102 may not be aware of the connection with secondary wireless headphone 106) according to the short-range wireless communication protocol. For example, physical layer module 206 may generate baseband packets (e.g., BLUETOOTH packets) based on the music and/or voice data (payload) and perform error correction using any known methods, such as forward error correction (FEC) and automatic repeat request (ARQ).

In some embodiments, the transmission of the audio information may occur at the audio data packet level in time slots. For example, according to the standard BLUETOOTH protocol, the physical channel of the BLUETOOTH connection is divided into time slots, each of which has the same duration (e.g., 625 µs). RF module 204 in conjunction with antenna 202 may transmit an audio data packet (N) in a time slot (N). Based on the receptions of the audio data packet (N) in the time slot (N) at primary wireless headphone 104 and secondary wireless headphone 106, in the subsequent time slot (N+1), RF module 204 in conjunction with antenna 202 may receive a message from primary wireless headphone 104 or secondary wireless headphone 106 alone, or messages from both primary wireless headphone 104 and secondary wireless headphone 106, which are generated in response to the reception status of the audio data packet (N) in the time slot (N). It is understood that additional components, although not shown in FIG. 2, may be included in audio source 102.

Primary wireless headphone 104 in this example may include a wireless transceiver (primary wireless transceiver) configured to receive the audio information transmitted by audio source 102 and transmit error-correcting messages (with an ECC) in response to the reception of the audio information to audio source 102. The wireless transceiver may be further configured to transmit the communication parameters to secondary wireless headphone 106. Primary wireless headphone 104 may include other components, such as an enclosure, speakers, and a microphone (not shown). Primary wireless transceiver may include a first antenna 207 and a second antenna 209, a switch module 210, an RF module 212, a physical layer module 214, a MAC layer module 216, a host controller interface (HCI) 218, and a control module 220. Some or all of the modules mentioned above may be integrated onto the same IC chip to reduce the chip size and/or power consumption. Primary wireless headphone 104 may present at least part of the audio information received from audio source 102 to the user via one of the user's ear. For example, the speaker of primary wireless headphone 104 may play music and/or voice based on the entire audio information or one audio channel of the audio information.

In some embodiments, first antenna 207 and second antenna 209 may both include an array of conductors for transmitting and receiving radio waves at one or more RF bands corresponding to RF module 212. In some embodiments, first antenna 207 and second antenna 209 can be any of a wire antenna and/or a chip antenna. For example, the chip antenna may be thin filmed and/or laser curved on a shell of primary wireless headphone 104. The wire antenna may be winded/folded within the shell of primary wireless headphone 104.

Figure 3:
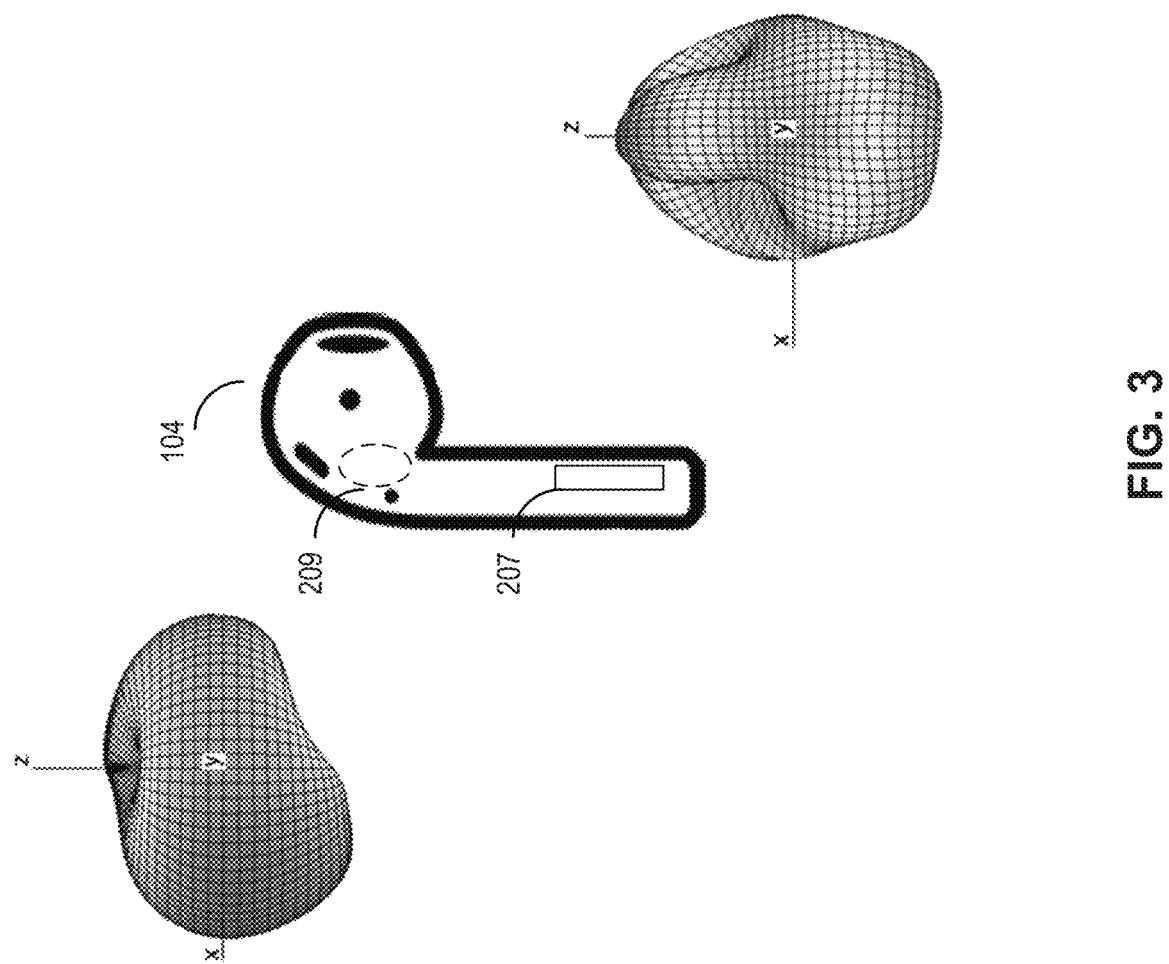
FIG. 3 is a block diagram illustrating an exemplary wireless headphone in accordance with an embodiment.

In some embodiments, first antenna 207 and second antenna 209 may have different RF radiation field distributions due to the positions and/or internal architectures of each antenna. For example, when being worn, first antenna 207 may be designed and/or positioned to have an RF radiation field with a higher intensity in the vertical direction than the horizontal direction (e.g., having the dominant radiation direction in the vertical direction) and second antenna 209 may be designed and/or positioned to have an RF radiation field with a higher intensity in the horizontal direction than the vertical direction (e.g., having the dominant radiation direction in the horizontal direction) as illustrated in FIG. 3. Moreover, in some embodiments, as illustrated in FIG. 3, first antenna 207 may be placed on a lower part of primary wireless headphone 104, and second antenna 209 may be placed on a higher part of primary wireless headphone 104. For example, as shown in FIG. 3, first antenna 207 may have the dominant radiation direction in the vertical direction along z axis (e.g., the first direction). The radiation field intensity in the vertical direction is higher than the horizontal direction along x axis (e.g., the second direction). Similarly, second antenna 209 may have the dominant radiation direction in the horizontal direction along x axis (e.g., the first direction). The radiation field intensity in the horizontal direction is higher than the vertical direction along z axis (e.g., the second direction). When worn by the user, both first and second wireless headphones 104 and 106 are placed at substantially the same horizontal level.

In this way, primary wireless headphone 104 may better exploit the characteristics of the RF radiation field of each of first and second antennas 207 and 209 (e.g., dominant radiation directions) and the relative position of audio source 102, primary wireless headphone 104, and secondary wireless headphone 106 to increase the quality of the data transmitted and reduce the power consumption for transmitting the data.

In some embodiments, the intensity difference of the RF radiation field of first antenna 207 between the horizontal direction and the vertical direction is lower than a first predetermined threshold. The intensity difference of the RF radiation field of second antenna 209 between the horizontal direction and the vertical direction is lower than a second predetermined threshold. In other words, the intensity differences between the dominant radiation direction and the data transmitting direction orthorgnal to the dominant radiation direction for both first and second antennas 207 and 209 are less than the first and the second predetermined threshold respectively. This can ensure the data transmission quality in both the horizontal and the vertical directions for both first and second antennas 207 and 209 when 1) first and second wireless headphones 104 and 106 are not placed exactly horizontally and/or 2) first wireless headphone 104 and audio source are not place exactly vertically.

Accordingly, as first antenna 207 may mainly be configured to establish communication link(s) with audio source 102, which normally would be placed below wireless headphones 104 and 106 (e.g., in a pocket), and second antenna 209 may mainly be configured to establish communication link(s) between wireless headphones 104 and 106 which would normally be place on the same level (e.g., the right and left side of the user's head), data can be transmitted by an antenna with better directional intensity in substantially that transmitting direction. This would increase the data quality and reduce the power consumption for wireless communication.

Figure 4:
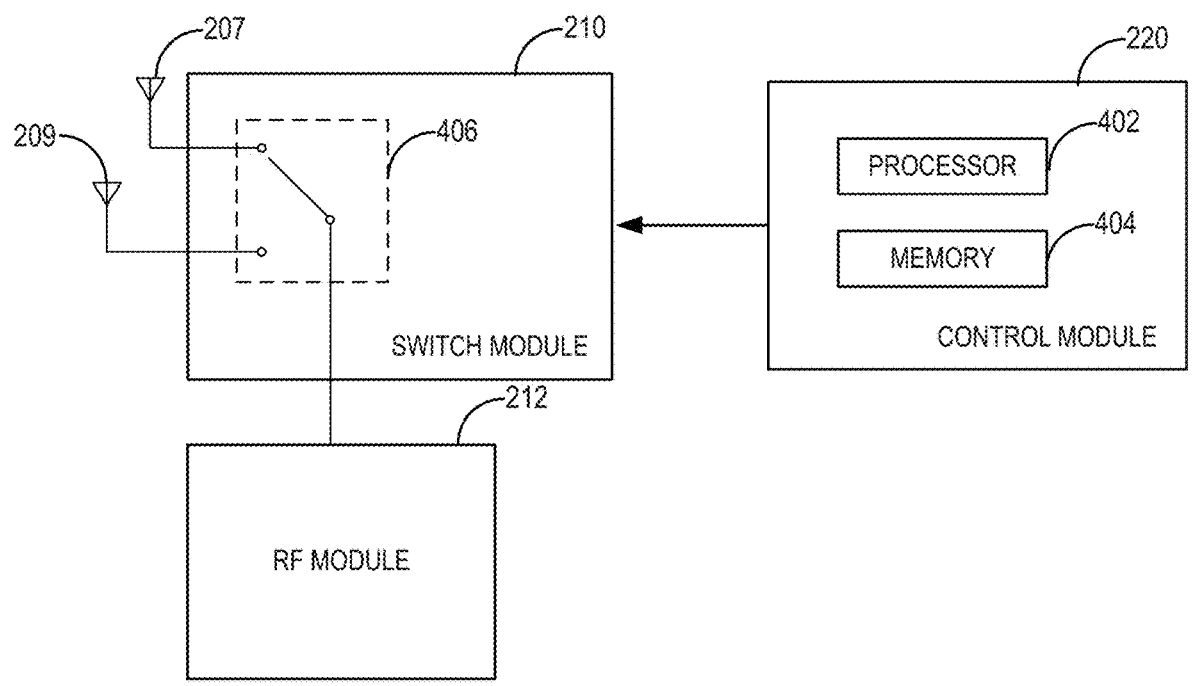
FIG. 4 is a block diagram illustrating an exemplary control module of the examplary wireless headphone in FIG. 3 in accordance with an embodiment.

In some embodiments, control module 220 may determine whether to switch the antenna in use of primary wireless headphone 104 based on a currently using antenna and a wireless communication link to be established. For example, as illustrated in FIG. 4, control module 220 may include a processor 402 for generating the switch instructions based on a currently using antenna and a wireless communication link to be established and may include a memory 404 for storing relevant data. In some embodiments, processor 402 and memory 404 may be integrated on the same system on chip (SOC).

In some embodiments, processor 402 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 402 may be a hardware device having one or more processing cores. Processor 402 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software. Although only one processor is shown, it is understood that multiple processors can be included. In some embodiments, the antenna switching action can be implemented by setting the hardware using the software executed by processor 402. For example, the executed software may set up a time point for the switch (e.g., when the counter/timer counts to a certain number) on the hardware. This allows the hardware to switch according to predetermined order and does not need to involve the software each time the switch happens. This would reduce the computing power used by processor 402.

Memory 404 can broadly include both memory and storage. For example, memory 404 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 402. Broadly, memory 404 may be embodied by any computer-readable medium, such as a non-transitory computer-readable medium.

In one example, if the current using antenna is first antenna 207 (e.g., primary wireless headphone 104 is communicating or finishing communicating with audio source 102), and a communication link with wireless headphone 106 (e.g., for transmitting communication parameters associated with the normal communication link between primary wireless headphone 104 and audio source 102, and/or the ECC MSG, or for redirecting audio information) is to be established, control module 220 may generate a switch instruction instructing switch module 210 to switch the working antenna (i.e., antenna in use) from first antenna 207 to second antenna 209. In another example, if the current using antenna is second antenna 209 (e.g., primary wireless headphone 104 is communicating or finishing communicating with secondary wireless headphone 106), and the normal communication link (e.g., the communication link with audio source 102) is to be established (e.g., for transmitting ACK/NACK and/or receiving audio information), control module 220 may generate a switch instruction instructing switch module 210 to switch the working antenna (i.e., antenna in use) from second antenna 209 to first antenna 207.

It is understood that, although in most cases the ECC MSG is transmitted between primary wireless headphone 104 and secondary wireless headphone 106 through the communication link established based on second antenna 209, in some embodiments, the ECC MSG may also be transmitted through first antenna 207, e.g., when first antenna 207 was in use, and there is not enough time for the antenna switching.

In some embodiments, both first antenna 207 and second antenna 209 may be in use for communicating (e.g., transmitting and/or receiving data) with audio source 102 and/or secondary wireless headphone 106. For example, the data transmission (e.g., the transmitted time slots) may be allocated between first antenna 207 and second antenna 209 at different proportion for different communication link. For example, for the communication link between audio source 102 and primary wireless headphone 104, the data transmission allocated between first antenna 207 and second antenna 209 may initially be set at 1:1. Determining based on the quality of the data transmitted by each antenna, the data transmission allocation may be switched/adjusted, to such as, 3:1, 3:2, 1:2, 1:3, etc. upon receiving the switch instruction. For example, control module 220 may be configured to generate the switch instruction based on determining the quality (e.g., signal-to-noise ratio (SNR), received signal strength indicator (RSSI)), packet error rate (PER), or Packet loss rate (PLR)) of the data received by first antenna 207 and second antenna 209 individually. The better the data quality is, the higher portion of data transmission can be allocated to the corresponding antenna. Similarly, for the communication link between primary wireless headphone 104 and secondary wireless headphone 106, the data transmission allocated between first antenna 207 and second antenna 209 may initially be set at 1:1 and later be switched/adjusted to 1:3, 1:2, 2:1, 3:1, etc. based on the scheme described above. In some embodiments, the quality of the data received by first antenna 207 and second antenna 209 can be determined regardless of through which communication link it was received.

Figure 5:
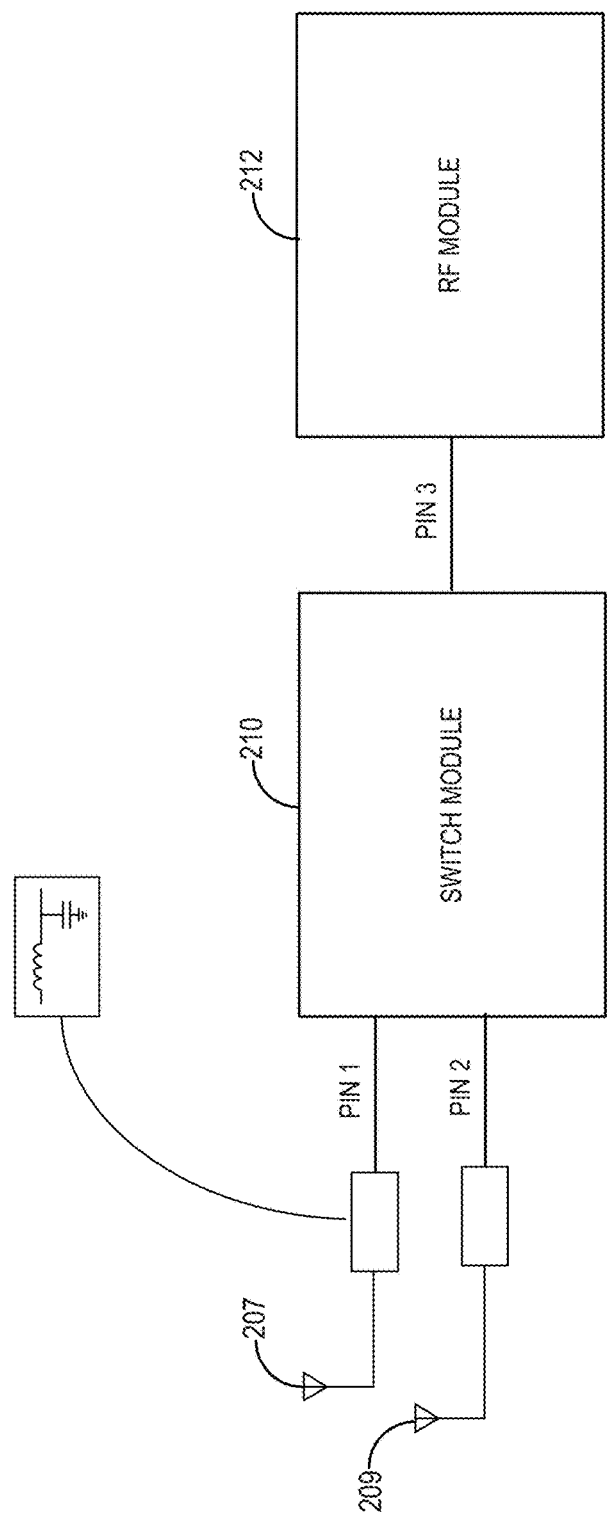
FIG. 5 is a block diagram illustrating an exemplary switch module of the examplary wireless headphone in FIG. 3 in accordance with an embodiment.

Referring back to FIG. 2, switch module 210 may be configured to switch among first antenna 207 and second antenna 209 upon receiving the switch instruction from control module 220. For example, as illustrated in FIG. 4, switch module 210 may include an RF switch 406 configured to selectively establish/switch the connection between RF module 212 and one of first or second antenna 207 or 209 (e.g., enabling first or second antenna 207 or 209) based on the switch instruction(s) received from control module 220. For example, as illustrated in FIG. 5, the RF switch may be a switch chip including one input path (e.g., PIN 1) and two output paths (e.g., PIN 2 and PIN 3). The input path may be connected to RF module 212 for receiving the input signals (e.g., the audio information, the communication parameters, and/or ECC MSG), and the output paths may be connected to first and second antennas 207 and 209, respectively. The switch may be configured to route the input signal to different antennas (e.g., first and second antennas 207 and 209) based on the data to be transmitted and/or the switch instruction received from control module 220.

In some embodiments, as illustrated in FIG. 5, each of the output paths may include an antenna matching circuit including a conductor and an inductor connected in parallel. The antenna may be connected to the conductor of the antenna matching circuit, and the inductor may be connected to the ground. In some embodiments, the conductance of the conductor and the inductance of the inductor can be design/chosen according to a resistance of the antenna connected to the antenna matching circuit. It is understood that the circuit design for the antenna matching circuit disclosed herein is just for illustrative purposes only. Any suitable circuit design can be applied for connecting the PINs of the RF switch and the antennas and would be apparent to those skilled in the art upon examination of the following and the accompanying drawings or may be learned by production or operation of the examples.

Referring back to FIG. 2, RF module 212 may be configured to receive, from audio source 102, audio information and transmit, to audio source 102, messages (e.g., ACK and NACK messages) via first antenna 207. RF module 212 may also be configured to transmit, to secondary wireless headphone 106, the communication parameters and error-correcting messages (when primary wireless headphone 104 works as the transmitting headphone), or redirect audio information to secondary wireless headphone 106 (e.g., when the wireless audio system works in a redirect mode) via second antenna 209. In some embodiments, RF module 212 may be further configured to receive, from secondary wireless headphone 106, the communication parameters, error-correcting messages (when primary wireless headphone 104 works as the receiving headphone), or the audio information redirected from secondary wireless headphone 106 via second antenna 209.

Physical layer module 214 may be configured to generate the physical links (baseband) between audio source 102 and primary wireless headphone 104 according to the short-range wireless communication protocol used by RF module 212. For example, physical layer module 214 may generate baseband packets (e.g., BLUETOOTH packets) based on the music and/or voice data (payload) and perform error correction using any known methods, such as FEC and ARQ. MAC layer module 216 may be configured to generate the logical data channel links between audio source 102 and primary wireless headphone 104 according to the short-range wireless communication protocol and between primary wireless headphone 104 and secondary wireless headphone 106. For example, MAC layer module 216 may generate a link control channel, link manager channel, user asynchronous channel, user isochronous channel, and user synchronous channel based on the BLUETOOTH protocol (and the amended BLUETOOTH protocol). HCI 218 may be configured to provide a common interface to physical layer module 214 and MAC layer module 216 and access to hardware status and control registers. For example, when implementing the BLUETOOTH protocol, HCI 218 may provide a uniform method of accessing the BLUETOOTH baseband capabilities. In some embodiments, the error correction messages are transmitted based on the BLUETOOTH protocol in network layers above a physical layer, for example, by MAC layer module 216 and HCI 218, and are transmitted in the physical layer, for example, by physical layer module 214.

Control module 220 may be further configured to control the generation of the ECC based on the successfully received audio information when primary wireless headphone 104 is working as a transmitting headphone or control the correction of the audio information based on the received ECC when primary wireless headphone 104 is working as a receiving headphone. Control module 220 may be further configured to determine whether to transmit an ACK message or a NACK message to audio source 102 depending on whether the audio information is received successfully by one or both of primary and secondary wireless headphones 104 and 106.

Secondary wireless headphone 106 in this example may include a wireless transceiver (secondary wireless transceiver) configured to receive communication parameters and/or error-correcting messages from primary wireless headphone 104, and receive/snoop the audio information transmitted by audio source 102 based on the communication parameters and/or error-correcting messages. Secondary wireless headphone 106 may include other components, such as an enclosure, speakers, and a microphone (not shown). Secondary wireless transceiver may include a first antenna 221, a second antenna 223, a switch module 224, an RF module 226, a physical layer module 228, a MAC layer module 230, an HCI 232, and a control module 234. Some or all of the modules mentioned above may be integrated onto the same IC chip to reduce the chip size and/or power consumption. Secondary wireless headphone 106 may present at least part of the audio information to the user via one of the user's ear. For example, the speaker of secondary wireless headphone 106 may play music and/or voice based on the audio information or one audio channel of the audio information.

In this example, secondary wireless headphone 106 has the same hardware structures as primary wireless headphone 104. The functions of each module mentioned above in secondary wireless headphone 106 are the same as the counterparts in primary wireless headphone 104 and thus, will not be repeated. Different from primary wireless headphone 104, secondary wireless headphone 106 in this example works in the snoop mode/redirect mode. In snoop mode, audio source 102 may not recognize the connection with secondary wireless headphone 106. To enable secondary wireless headphone 106 to work in the snoop mode, in some embodiments, RF module 212 of primary wireless headphone 104 may transmit, to RF module 226 of secondary wireless headphone 106, one or more communication parameters associated with the short-range wireless communication protocol used between audio source 102 and primary wireless headphone 104. The communication parameters may include any parameters necessary for enabling secondary wireless headphone 106 to snoop the communications between audio source 102 and primary wireless headphone 104, such as the address of audio source 102 (e.g., the IP address or MAC address) and the encryption parameters used between audio source 102 and primary wireless headphone 104.

As described above, similar to control module 220 of primary wireless headphone 104, control module 234 of secondary wireless headphone 106 may control secondary wireless headphone 106 to switch between first antenna 221 and second antenna 223 based on a currently using antenna and a wireless communication link to be established as described above in detail. For example, both control modules 220 and 234 may work together to switch first antenna 207 and second antenna 209 of primary wireless headphone 104, and first antenna 221 and second antenna 223 secondary wireless headphone 106 to improve the overall performance of the pair of wireless headphones 104 and 106 as described above in detail.

Figure 6:
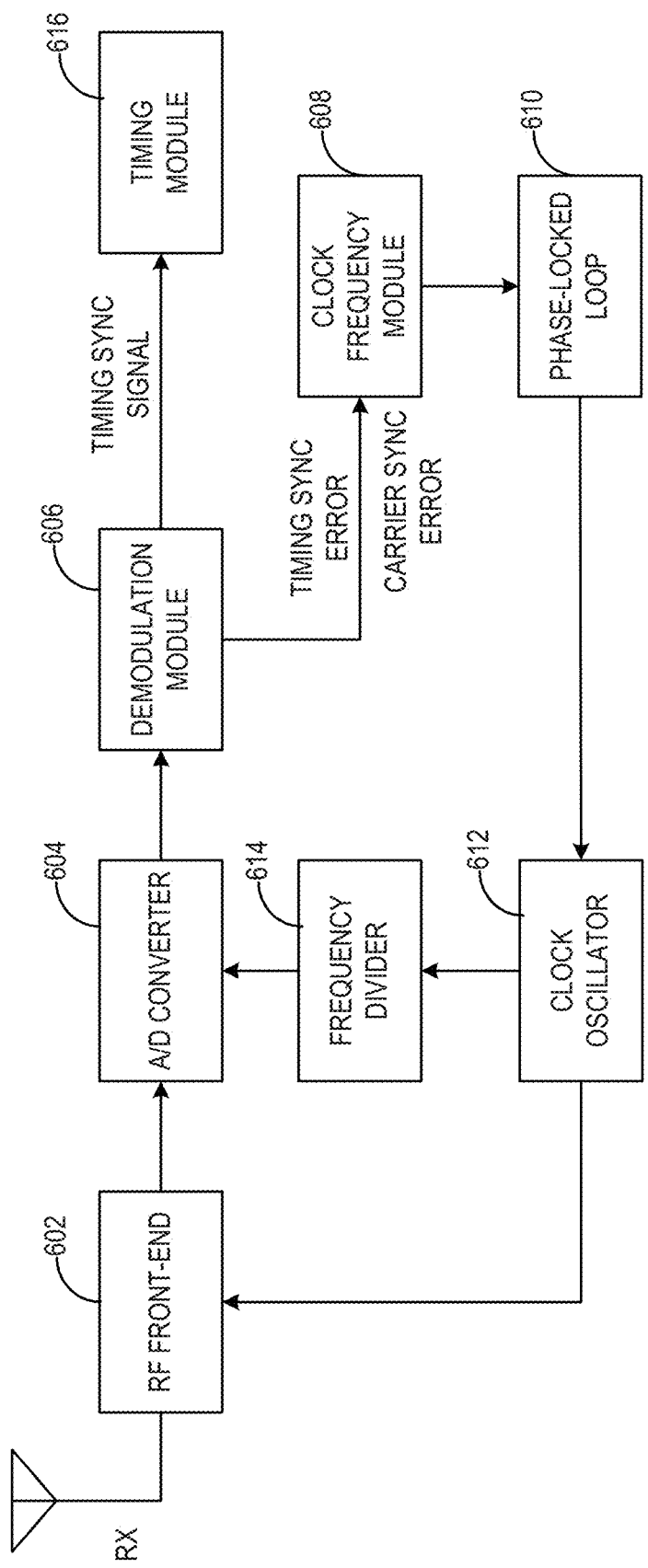
FIG. 6 is a block diagram illustrating an exemplary wireless headphone in FIG. 3 in accordance with an embodiment.

FIG. 6 is a block diagram illustrating exemplary wireless headphone 104 or 106 in accordance with an embodiment. In this example, each of primary wireless headphone 104 and secondary wireless headphone 106 includes an RF front-end 602, an analog-to-digital (A/D) converter 604, a demodulation module 606, a clock frequency module 608, a phase-locked loop (PLL) 610, a clock oscillator 612, a frequency divider 614, and a timing module 616. RF front-end 602 may be operatively coupled to antennas (e.g., first and second antennas 207 and 209) and configured to receive/transmit the RF signals, such as audio signals representing the audio information described above in detail. RF front-end 602 may include an antenna switch (e.g., switch module 210), low-noise amplifier (LNA), power amplifier (PA), filter, etc. A/D converter 604 may be operatively coupled to RF front-end 602 and configured to convert an audio signal from an analog signal to a digital signal and provide the digital audio signal to demodulation module 606 that is operatively coupled to A/D converter 604. The A/D conversion may be performed by A/D converter 604 based on an A/D sampling rate determined by frequency divider 614.

In some embodiments, primary wireless headphone 104 and secondary wireless headphone 106 may not communicate directly except for transmitting the communication parameters, error correction messages, and/or the audio information as described above. Primary wireless headphone 104 and secondary wireless headphone 106 may be synchronized via their communications with audio source 102. The local clocks of each of primary wireless headphone 104 and secondary wireless headphone 106 may be synchronized with the remote clock of audio source 102 and thus, are synchronized with one another. By indirectly synchronizing primary wireless headphone 104 and secondary wireless headphone 106 via audio source 102, the sound can be simultaneously played by both primary wireless headphone 104 and secondary wireless headphone 106.

Figure 7A:
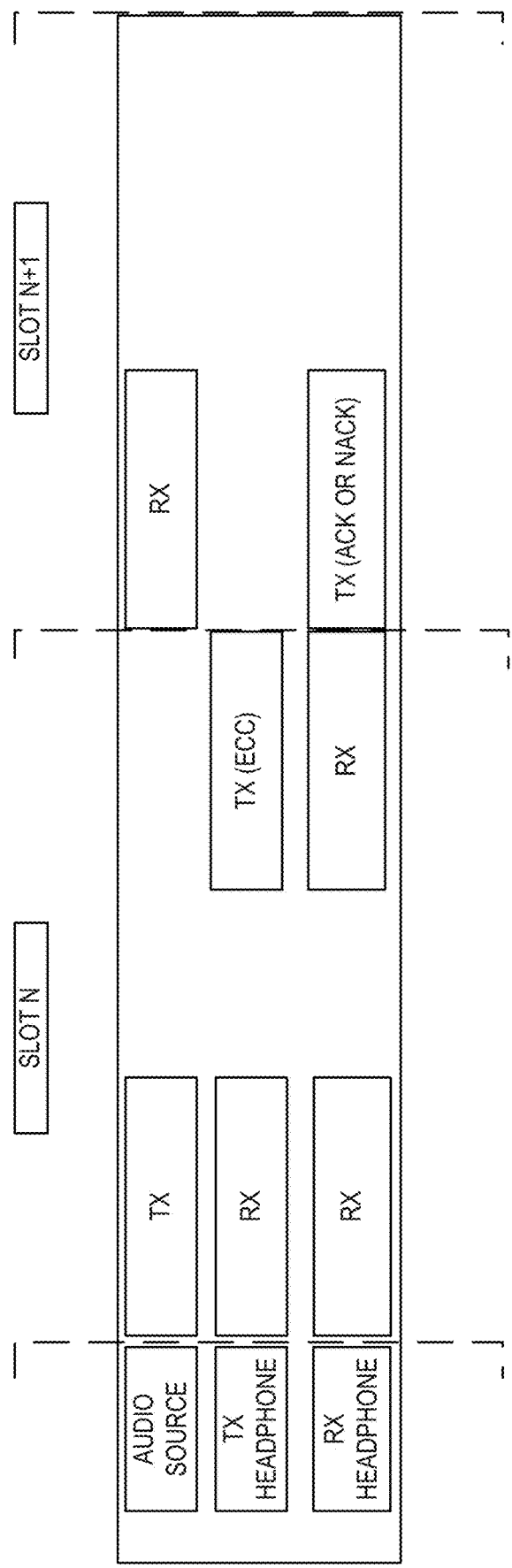
FIGS. 7A and 7B are timing diagrams of exemplary wireless audio systems in accordance with various embodiments.
Figure 7B:
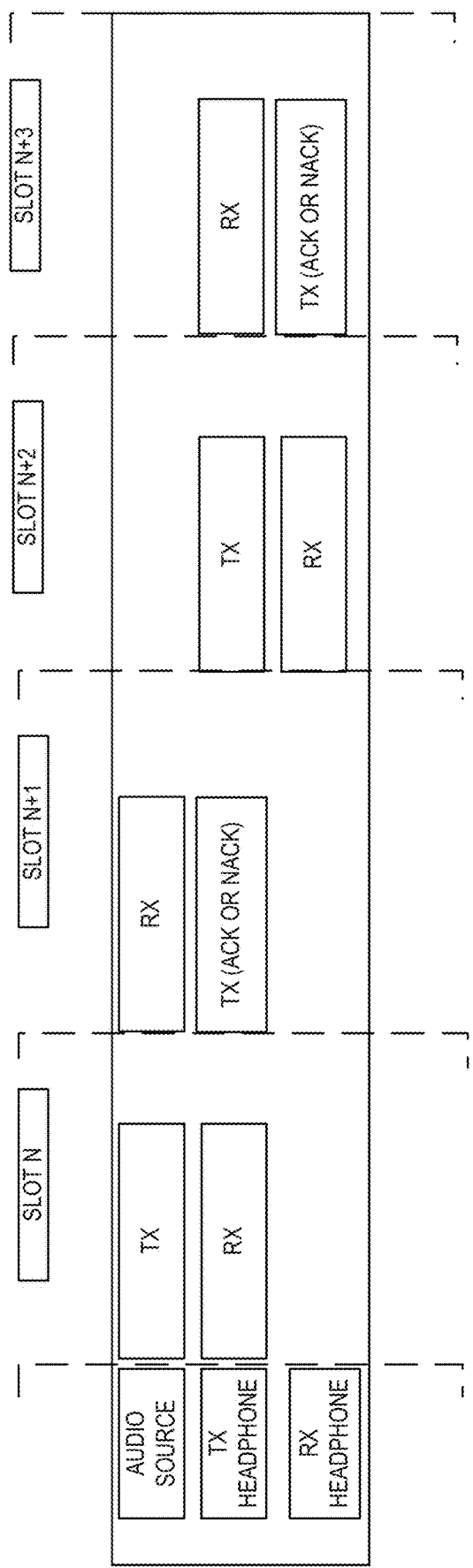

FIGS. 7A-7B are timing diagrams of exemplary wireless audio systems in accordance with various embodiments. As described above, error-correcting messages may be transmitted from a transmitting headphone to a receiving headphone. As described above, in some embodiments, each of the time slots (e.g., N and N+1) has the same duration, for example, 625 μs for BLUETOOTH communication. As shown in FIG. 7A, in a first time slot (N), the audio source transmits an audio data packet (e.g., a BLUETOOTH audio data packet), and each of the transmitting headphone (e.g., through normal communication link using first antenna 207 in FIG. 2) and receiving headphones (e.g., through snoop link) receives the audio data packet. In the same time slot (N), the transmitting headphone transmits an error-correcting message including an ECC and/or an ACK/NACK message indicating whether the transmitting headphone successfully receives the audio data packet in time slot (N) using second antenna 209 in FIG. 2. In the same time slot (N), the receiving headphone receives the error-correcting message or ACK/NACK message from the transmitting headphone. The switch between first antenna 207 and second antenna second antenna 209 may be performed according to the descriptions above and below.

In a second time slot (N+1) immediately subsequent to the first time slot (N), the receiving headphone may transmit an ACK message or a NACK message to the audio source indicating whether it successfully receives the audio data packet based on the error-correcting message in the first time slot (N).

It is understood that in FIG. 7A, each audio data packet is transmitted within a single time slot, e.g., the first time slot (N), for example, according to BLUETOOTH Hands Free Profile (HFP). In the time slot in which the audio data packet is transmitted by the audio source, the audio data packet and the error-correcting message can share the same time slot. For example, the audio data packet may be transmitted prior to the error-correcting message in the same time slot. In some embodiments, each audio data packet can be transmitted within multiple time slots, for example, according to BLUETOOTH A2DP.

As shown in FIG. 7B, the audio data packet is transmitted from the audio source to the transmitting headphone in N slots, and in a time slot immediately subsequent to the last one of N slots, e.g., (N+1)th slot, an ACK/NACK message indicating whether it successfully receives the audio data packet is transmitted from the transmitting headphone to the audio source. In the next slot, e.g., (N+2)th slot, the transmitting headphone transmits the audio information (e.g., redirect) to the receiving headphone. In the next slot, e.g., (N+2)th slot, the receiving headphone transmits an ACK/NACK message indicating whether it successfully receives the audio data packet to the transmitting headphone as described above in detail.

It is further understood that in some embodiments, the error-correcting message may be transmitted in more than one time slot. In the case in which the audio data packet and the error-correcting message are transmitted in N time slots (e.g., 3 or 5 time slots), the specific numbers of time slots within the N time slots used for transmitting the respective audio data packet and the error-correcting message are not limited as long as the audio data packet is transmitted prior to the error-correcting message in the N time slots. Thus, the error-correcting message may be transmitted in the last one or more time slots of the N time slots. FIG. 8 is a flow chart illustrating an exemplary method 800 for antenna switching in accordance with an embodiment. Method 800 can be performed by processing logic that can include hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 8, as will be understood by a person of ordinary skill in the art.

Method 800 shall be described with reference to FIGS. 1A, 1B, and 2-6. However, method 800 is not limited to that exemplary embodiment. Starting at 802, the current condition of the communication links is determined. In steps 804 and 812, the communication link to be established may be determined by a processor (e.g., control module 220 in FIG. 2). For example, in step 804, the processor may determine if the wireless headphone is going to communicate with the audio source (e.g., audio source 102). If yes, at step 806, the processor may determine if the currently using antenna is the second antenna (e.g., second antenna 209), supposedly being used for communication between the wireless headphones. If yes, at step 808, a switch instruction for switching to the first antenna (e.g., second antenna 207) is generated and may be transmitted to the switch module (e.g., switch module 210) for switching the antenna to be used for establishing the communication link. If no, at step 810, the current state may be kept, and no switch instruction would be generated.

Referring back to step 804, if the answer is no, at step 812, the processor may determine if the communication link to be established is with the other wireless headphone. If no, method 800 cycles back to step 802 and waiting for another time point for determining the switching process. If yes, at step 814, the processor may determine if the currently using antenna is the second antenna (e.g., second antenna 209), supposedly being used for communication between the wireless headphone and the audio source. If yes, at step 816, a switch instruction for switching to the second antenna is generated and may be transmitted to the switch module (e.g., switch module 210) for switching the antenna to be used for establishing the communication link to be established. If no, at step 810, the current state may be kept, and no switch instruction would be generated.

Figure 9:
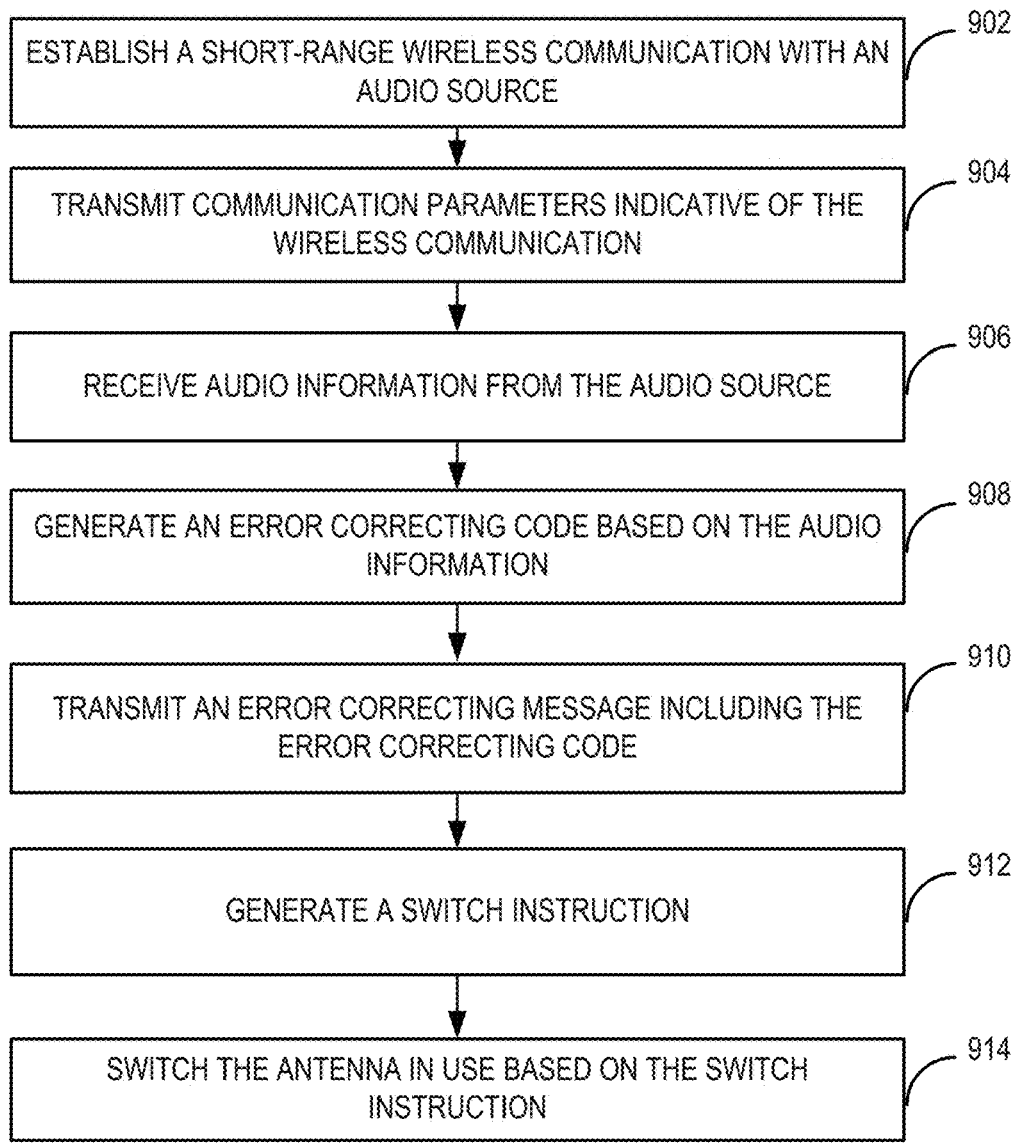
FIG. 9 is a flow chart illustrating an exemplary method for wirelessly communicating audio information in accordance with an embodiment.

FIG. 9 is a flow chart illustrating an exemplary method 900 for wirelessly communicating audio information in accordance with an embodiment. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 9, as will be understood by a person of ordinary skill in the art.

Method 900 shall be described with reference to FIGS. 1A, 1B, and 2-6. However, method 900 is not limited to that exemplary embodiment. Starting at 902, a first type of short-range wireless communication, such as BLUETOOTH communication, is established with an audio source. In some embodiments, the short-range wireless communication is established between primary wireless headphone 104 and audio source 102 using first antenna 207 that having the dominant radiation direction in substantially the vertical direction. At 904, communication parameters indicative of the short-range wireless communication are transmitted. In some embodiments, the communication parameters are transmitted from primary wireless headphone 104 to secondary wireless headphone 106 using the first type of short-range wireless communication, such as BLUETOOTH communication, or a second type of short-range wireless communication, such as WiFi communication or NFMI communication using second antenna 209 having the dominant radiation direction in substantially the horizontal direction. In some other embodiments, the communication parameters may also be transmitted from secondary wireless headphone 106 to primary wireless headphone 104 using the first type or the second type of short-range wireless communication.

At 906, audio information is received by the transmitting headphone using the first type of short-range wireless communication, such as BLUETOOTH communication, and by a receiving headphone from the audio source by snooping the first type of short-range wireless communication. In some embodiments, the receiving headphone is secondary wireless headphone 106, and the audio information is snooped by secondary wireless headphone 106 via the snoop communication link, established based on the communication parameters received from primary wireless headphone 104. In some embodiments, the transmitting headphone may transmit a first ACK/NACK message indicating whether the audio information is received correctly to the audio source.

At 908, an ECC is generated by the ECC transmitting headphone based on the audio information received by the ECC transmitting headphone in response to successfully receiving the audio information. The audio information may include an audio data packet (e.g., a BLUETOOTH audio data packet), and the error-correcting code may be generated by coding a payload of the audio data packet. In some embodiments, control module 220 of primary wireless headphone 104 controls the coding of the payload when primary wireless headphone 104 is the ECC transmitting headphone. In some embodiments, control module 234 of secondary wireless headphone 106 controls the coding of the payload when secondary wireless headphone 106 is the ECC transmitting headphone.

At 910, a first error correcting message including the ECC but not the audio information is transmitted by the ECC transmitting headphone. The error-correcting message may be transmitted using the communication link established between primary and secondary wireless headphones 104 and 106 using second antenna 209. In one example, a BLUETOOTH audio data packet and the first error-correcting message are transmitted in the same time slot subsequently. In another example, a BLUETOOTH audio data packet is transmitted over multiple time slots, and the first error-correcting message is transmitted at the end of the last one or more of the multiple time slots. In some embodiments, RF module 212 of primary wireless headphone 104 transmits the first error-correcting message when primary wireless headphone 104 is the ECC transmitting headphone. In some embodiments, RF module 226 of secondary wireless headphone 106 transmits the first error-correcting message when secondary wireless headphone 106 is the ECC transmitting headphone.

At 912, a switch instruction for switching the antenna in use is generated based on the current antenna in use and the communication link to be established. In some embodiments, the switch instruction may be generated by control module 220 and/or control module 234 (e.g., when secondary wireless headphone 106 is acting as the transmitting headphone) according to the method described in FIG. 8. In some embodiments, the switch instruction may be generated based on a data transmission quality determined as described above. At 914, the antenna in use is switched (e.g., from first antenna 207 to second antenna 209 or from second antenna 209 to first antenna 207) upon receiving the switch instruction.

It is understood that all the error-correcting messages including the audio information disclosed herein may additionally include the ECC generated by coding the payload of an audio data packet. In other words, the difference between the first error-correcting messages and the second error correcting messages may only be whether it includes the audio information.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:

1. A wireless transceiver comprising:
   a first antenna configured to establish a first wireless communication link with an audio source;
   a second antenna configured to establish a second wireless communication link with another wireless transceiver,
   a radio frequency (RF) module configured to: receive audio information from the audio source using the first wireless communication link; and transmit audio play information to the another wireless transceiver using the second wireless communication link; and
   a control module configured to generate a switching instruction for switching among the first antenna and the second antenna based on a currently using antenna and a wireless communication link to be established,
   wherein a first RF radiation field of the first antenna has a higher intensity in a first direction than a second direction orthogonal to the first direction, and a second RF radiation field of the second antenna has a higher intensity in the second direction than the first direction.

2. The wireless transceiver of claim 1, further comprising a switch module configured to switch among the first antenna and the second antenna upon receiving the switching instruction from the control module.

3. The wireless transceiver of claim 2, wherein the switch module comprises an RF switch operatively coupled to the RF module, the first antenna, and the second antenna, configured to selectively establish a connection between the RF module, and the first antenna or the second antenna.

4. The wireless transceiver of claim 1, wherein the RF module is further configured to transmit an error-correcting code (ECC) to the another wireless transceiver using the second wireless communication link.

5. The wireless transceiver of claim 1, wherein the first antenna is disposed at a lower portion of the wireless transceiver, and wherein the second antenna is disposed at an upper portion of the wireless transceiver.

6. The wireless transceiver of claim 1, wherein the first antenna comprises a wire antenna, and wherein the second antenna comprises a chip antenna.

7. The wireless transceiver of claim 1, wherein an intensity difference of the first RF radiation field of the first antenna between the first direction and the second direction is lower than a first predetermined threshold, and wherein the intensity difference of the second RF radiation field of the second antenna between the second direction and the first direction is lower than a second predetermined threshold.

8. The wireless transceiver of claim 1, wherein the audio play information includes at least one of a communication parameter associated with the first wireless communication link, synchronizing information, frequency hopping information, volume control information, role switching information, and the audio information.

9. The wireless transceiver of claim 1, wherein the RF module is further configured to transmit an acknowledgment (ACK) message indicating the audio information is received correctly to the audio source using the first wireless communication link.

10. A wireless audio system, comprising:
    a first wireless headphone and a second wireless headphone, wherein the first wireless headphone is configured to:
    receive, from an audio source, audio information based on a first wireless communication link using a first antenna; and
    transmit, to a second wireless headphone, audio play information based on a second communication link using a second antenna,
    wherein the first wireless headphone is further configured to generate a switching instruction for switching among the first antenna and the second antenna based on a currently using antenna and a wireless communication link to be established, and
    wherein a first RF radiation field of the first antenna has a higher intensity in a first direction than a second direction orthogonal to the first direction, and a second RF radiation field of the second antenna has a higher intensity in the second direction than the first direction.

11. The wireless audio system of claim 10, wherein the first wireless headphone is further configured to switch among the first antenna and the second antenna upon obtaining the switching instruction.

12. The wireless audio system of claim 10, wherein the first wireless headphone is further configured to selectively enable the first antenna or the second antenna.

13. The wireless audio system of claim 10, wherein the first wireless headphone is further configured to transmit an error-correcting code (ECC) to the another wireless transceiver using the second wireless communication link.

14. The wireless audio system of claim 10, wherein the first wireless communication link and the second wireless communication link comprise at least one of BLUETOOTH communication or Wi-Fi communication.

15. The wireless audio system of claim 10, wherein the first antenna comprises a wire antenna, and wherein the second antenna comprises a chip antenna.

16. The wireless audio system of claim 10, wherein an intensity difference of the first RF radiation field of the first antenna between the first direction and the second direction is lower than a first predetermined threshold, and wherein the intensity difference of the second RF radiation field of the second antenna between the second direction and the first direction is lower than a second predetermined threshold.

17. A method for wirelessly communicating audio information, comprising:
    receiving, from an audio source, audio information using a first wireless communication link established based on a first antenna;
    transmitting, to a wireless transceiver, audio play information using a second wireless communication link established based on a second antenna;
    generating, a switch instruction for switching among the first antenna and the second antenna based on a currently using antenna and a wireless communication link to be established; and
    switching, among the first antenna and the second antenna upon obtaining the switch instruction,
    wherein a first RF radiation field of the first antenna has a higher intensity in a first direction than a second direction orthogonal to the first direction, and a second RF radiation field of the second antenna has a higher intensity in the second direction than the first direction.

18. The method of claim 17, further comprising transmitting an error-correcting code (ECC) to the wireless transceiver using the second wireless communication link.

\* \* \* \* \*